(12) United States Patent
Woudstra et al.

(10) Patent No.: US 11,167,600 B2
(45) Date of Patent: Nov. 9, 2021

(54) PNEUMATIC TIRE

(71) Applicant: Apollo Tyres Global R&D B.V., Enschede (NL)

(72) Inventors: Ydwer Rinske Woudstra, Enschede (NL); Ysbrand Hans Wijnant, Enschede (NL); Dirk Anton Bekke, De Lutte (NL)

(73) Assignee: Apollo Tyres Global R&D B.V., Enschede (NL)

( * ) Notice: Subject to any disclaimer, the term of this patent is extended or adjusted under 35 U.S.C. 154(b) by 175 days.

(21) Appl. No.: 16/099,583

(22) PCT Filed: May 9, 2017

(86) PCT No.: PCT/EP2017/061079
§ 371 (c)(1),
(2) Date: Nov. 7, 2018

(87) PCT Pub. No.: WO2017/194549
PCT Pub. Date: Nov. 16, 2017

(65) Prior Publication Data
US 2019/0160882 A1    May 30, 2019

(30) Foreign Application Priority Data
May 11, 2016 (GB) ...................... 1608284

(51) Int. Cl.
*B60C 11/13* (2006.01)
*B60C 11/04* (2006.01)
(Continued)

(52) U.S. Cl.
CPC ...... *B60C 11/1353* (2013.01); *B29D 30/0606* (2013.01); *B60C 11/04* (2013.01);
(Continued)

(58) Field of Classification Search
CPC ............ B60C 11/1353; B60C 11/1307; B60C 19/002; B60C 2011/1338; B60C 11/0309; B60C 11/042
See application file for complete search history.

(56) References Cited

U.S. PATENT DOCUMENTS

| 6,119,744 A | 9/2000 | Tsukagoshi |
| 2011/0000595 A1 | 1/2011 | Igarashi et al. |

(Continued)

FOREIGN PATENT DOCUMENTS

| EP | 0 391 600 A2 | 10/1990 |
| EP | 0 858 915 A1 | 8/1998 |

(Continued)

OTHER PUBLICATIONS

Smooth-On "Durometer Shore Hardness Scale" (Year: 2018).*

(Continued)

*Primary Examiner* — Katelyn W Smith
*Assistant Examiner* — Farah Taufiq
(74) *Attorney, Agent, or Firm* — Renner, Otto, Boisselle & Sklar, LLP

(57) ABSTRACT

A pneumatic tyre including a tread portion, wherein the tread portion has a groove which is oriented at an angle between +45 and −45 degrees with respect to the rolling direction of the tyre, the groove having a depth extending in the radial dimension, wherein the groove includes a plurality of protrusions extending along the direction of the groove, wherein each protrusion has a length in the direction of the groove, a width perpendicular to its length and a height. Each protrusion has a length of at least 75% of the circumferential length of the tyre tread.

12 Claims, 4 Drawing Sheets

(51) Int. Cl.
    *B60C 19/00*     (2006.01)
    *B29D 30/06*     (2006.01)

(52) U.S. Cl.
    CPC ........ *B60C 11/1307* (2013.01); *B60C 19/002* (2013.01); *B29D 2030/0612* (2013.01); *B60C 2011/1338* (2013.01); *B60C 2011/1361* (2013.01)

(56) References Cited

U.S. PATENT DOCUMENTS

| | | | |
|---|---|---|---|
| 2012/0273107 A1 | | 11/2012 | Le-Hen |
| 2013/0061993 A1 | | 3/2013 | Mathonet et al. |
| 2015/0136289 A1 | | 5/2015 | Muhlhoff, Jr. et al. |
| 2015/0239297 A1 | | 8/2015 | Bourgeois et al. |
| 2016/0318353 A1 | * | 11/2016 | Byrne ................ B60C 11/1307 |

FOREIGN PATENT DOCUMENTS

| | | | | | |
|---|---|---|---|---|---|
| EP | | 1 075 970 A2 | | 2/2001 | |
| EP | | 1075970 B1 | * | 10/2004 | ........ B60C 11/0309 |
| JP | | H06-115318 A | | 4/1994 | |
| JP | | H08-002212 A | | 1/1996 | |
| JP | | 2005-022580 A | | 1/2005 | |
| JP | | 2006-327320 A | | 12/2006 | |
| JP | | 2012-116339 A | | 6/2012 | |
| JP | | 2014-124985 A | | 7/2014 | |
| KR | | 10-2007-0055651 A | | 5/2007 | |
| WO | | 1980/000233 A1 | | 2/1980 | |
| WO | | WO-2011077562 A1 | * | 6/2011 | ........ B60C 11/0309 |
| WO | | 2011/132064 A1 | | 10/2011 | |
| WO | | 2015/100435 A1 | | 7/2015 | |
| WO | | 2016/092094 A1 | | 6/2016 | |

OTHER PUBLICATIONS

Rubber Hardness Chart "Mykins" (Year: 2016).*
International Preliminary Report on Patentability of corresponding International Application No. PCT/EP2017/061079 dated Nov. 22, 2018.
International Search Report and Written Opinion of corresponding International Application No. PCT/ES2017/061079 dated Aug. 17, 2017.
Search Report of corresponding GB Application No. 1608284.4 dated Oct. 24, 2016.

* cited by examiner

PNEUMATIC TIRE

This application is a national phase of International Application No. PCT/EP2017/061079 filed May 9, 2017, and claims priority to Great Britain Application No. 1608284.4 filed on May 11, 2016, which is incorporated herein by reference.

The present invention relates to a tyre with a groove designed for reduction of noise emission. The invention also relates to a method of manufacturing of such a tyre with reduced noise emission.

Tyres can be optimized on several properties. With the introduction of the European tyre label, three important features are especially considered. One important feature with respect to the environment is the rolling resistance. The lower the rolling resistance of a tyre, the less fuel is needed. As the tread is in direct contact with the road, the tread has the highest influence on the overall rolling resistance of the tyre. Rolling resistance can both be related to the tread material properties as well as the tread pattern. In principle, a tread material with a low tangent delta (tan δ) at 70° C. has a lower rolling resistance.

The car should also be able to brake quickly in several weather conditions. The wet grip properties can be tuned by the tread pattern as well as the material properties of the tread. In principle, a tread material with a high tan δ at 0° C. has better wet grip properties. However, optimizing for wet grip normally results in a trade-off on the rolling resistance properties The third property mentioned on the European tyre label is noise emission.

Noise emission originates from the tyre-road interaction. The tyre forms a contact patch with the road. The contact pressure variations between the rolling tyre and the road continuously deform the tyre construction upon which the tyre starts to vibrate and radiates noise. Together with the road the tyre forms a horn shape. Due to this shape the radiated sound power is increased by around 10 dB(A). This effect is called the horn effect. Inside the contact patch amplifications also occur, like the so-called pipe resonance of the enclosed grooves in the contact patch. This effect is responsible for an additional amplification of around 2 dB(A).

In the road industry the horn effect is reduced by porous road surfaces. The porosity inside these roads consist of small interconnected holes of a few mm in which the noise is scattered and absorbed by the viscothermal air inside. Therefore the porous road surfaces become sound absorbing. The drawback of these roads surfaces is on the other hand that the lifespan is extremely reduced from around 30 years for concrete road surfaces to around 5 years for porous asphalts. Therefore dense road surfaces, like concrete, are much more preferred and used, but they are responsible for higher noise levels.

At dense road surfaces the risk of hydroplaning is much higher. The water removal and storage capacity of porous asphalts is not present. The complete water removal and storage capacity therefore needs to come from the tyre. The grooves of the tyre tread pattern are therefore optimized to reduce the risk of hydroplaning towards higher driving speeds. The tyre tread generally comprises a variety of different grooves, such as lateral grooves, circumferential grooves, slant grooves, varying in depth, height and length. In addition, other groove element such as sipes might also be included in the tread pattern design. The drawback of these grooves is that the tread pattern itself is a source of the contact pressure variations generating noise.

Numerous attempts in the art have been made to reduce the noise emission from tyres. WO 2015/100435 describes a tyre having a tread, comprising a groove comprising a groove base and at least one groove sidewall; at least one flexible gate apparatus comprising a plurality of adjacent flexible gate elements oriented in a single row across at least a portion of the groove; wherein the plurality of flexible gate elements extend from the groove base; wherein the at least one flexible gate apparatus comprises a rigidity such that the at least one flexible gate apparatus does not substantially deflect at the application of an air pressure during operation; and wherein the at least one flexible gate apparatus comprises a rigidity such that the at least one flexible gate apparatus deflects at the application of a water pressure during operation.

EP 0391600 discloses a tyre tread pattern comprising a central zone and two edge zones in which the edge zones are subdivided circumferentially of the tyre by a series of transverse grooves each having an axially outer end open to the tread edge, wherein in each transverse groove a noise baffle comprises a circumferentially extending rib across the groove and has a height of 25% to 75% of the groove depth. The noise baffle is preferably quite narrow so that it does not materially affect the stiffness of the blocks but act as a noise baffle only. It may be a single baffle or two or more short baffles interlocking to block noise transmission.

WO 80/00233 relates to a vehicle tire, containing a tread block of which is provided with air-permeable channels covered against the tread surface, said channels allowing atmospheric air flow through a tread block between its leading and trailing sides as seen in the rolling direction. The channels comprise intercommunicating pores between rubber or plastic granules inter-connected by vulcanization.

Whereas the prior art describes several ways to reduce the noise emission by adding elements to the tread pattern to disturb the pipe resonance of the enclosed grooves in the contact patch, the additional sources of sound emission such as the horn-effect are not addressed by the prior art.

The present invention has the object to at least partially reduce the drawbacks of the prior art. In particular the invention has the object to reduce the noise emission by damping the horn effect generated by the tyre road interaction.

According to the invention this object has been achieved by a tyre according to claim 1.

Advantageous embodiments are given in the dependent claims. They can be combined freely unless the context clearly indicates otherwise.

The invention will be further described with reference to the following figures and examples without wishing to be limited by them.

Figure 1:
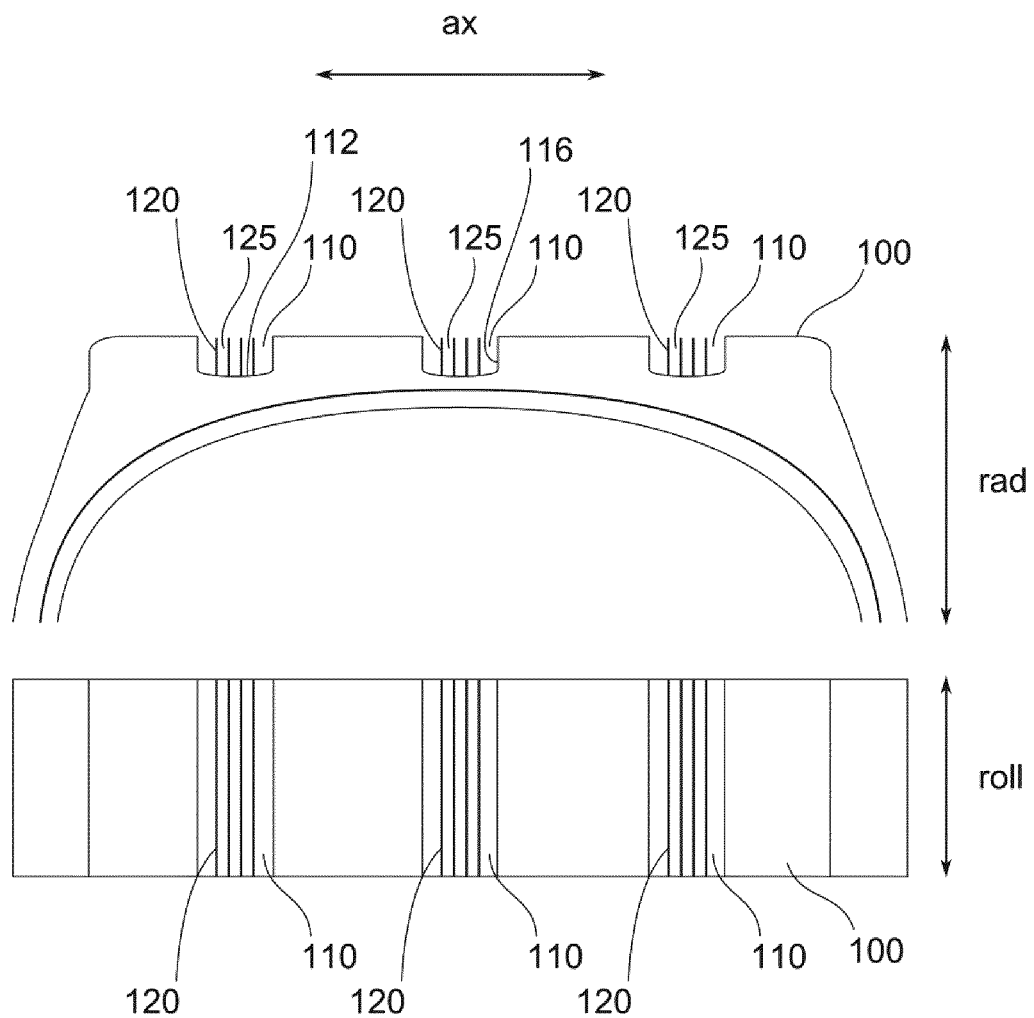
FIG. 1 shows a section of an embodiment of the tyre according to the invention in cross-sectional view and top view.

FIG. 1 schematically shows a part of a cross-section of a tyre according to the invention. The arrow with the reference ax defines an axial direction, whereas the arrow with the reference rad defines a radial direction and points in a radially outward direction. The arrow with reference roll corresponds to the rolling direction of the tyre when mounted on the vehicle. The rolling direction corresponds to the circumferential dimension of the tyre. This also applies to the subsequent figures. In the lower section of FIG. 1 a possible top view of the embodiment corresponding to the cross-section is also displayed.

The pneumatic tyre according to the invention comprises a tread portion 100, wherein the tread portion 100 comprises a groove 110 which is oriented at an angle between +45 and −45 degrees with respect to the rolling direction of the tyre, the groove 110 having a depth extending in the radial dimension. The groove 110 comprises a plurality of protrusions 120 extending along the direction of the groove. Each protrusion 120 has a length in the direction of the groove, a width perpendicular to its length and a height. Each protrusion 120 has a length of at least 25% of the circumferential length of the tyre tread.

Without wishing to be bound by theory it is believed that the air gaps 125 between the protrusions 120 contribute to viscothermal damping of the sound energy generated during the rolling of the tyre, thereby reducing the horn effect. This means that the overall noise emission of the tyre is reduced.

In a tyre according to the invention, the tyre comprises a tread portion 100 which comprises a groove 110 which is oriented at an angle between +45 and −45 degrees with respect to the rolling direction of the tyre. For example, in the bottom section of FIG. 1 the grooves 110 extend parallel to the rolling direction of the tyre, representing an angle of 0 degrees. The angle can be varied between +45 and −45 degree to adapt the tread profile to V-shaped grooves, which might enhance wet grip properties of the tyres. Preferably the angle is in a range between +25 to −25 degree, more preferred +10 to −10 degree.

The grooves 110 furthermore have a depth in the radial direction of the tyre, which is defined as the distance between the bottom of the groove 112 and the top of the groove at the surface of the tread portion 100.

The plurality of protrusions 120 are generally extending along the direction of the groove 110. This may mean that the protrusions extend parallel with the direction of the grooves, while allowing for a variation such as straight, wavy or angled protrusions.

According to the invention, the length of the protrusions 120 is at least 75% of the circumferential length of the tyre tread. The length of the tyre tread is measured at the tread surface, i.e. the tyre tread has a circumferential length corresponding to the distance traveled by the tyre in one rolling cycle. Preferably, the length of the protrusions 120 is is ≥100%. By extending the protrusions 120 in the direction of the groove 110, the overall volume in the tyre causing viscothermal effects is increased, thereby increasing sound energy dissipation.

Although not specified in FIG. 1, the cross-sectional shape of the protrusions 120 is not limited per se. For example, the protrusions 120 may have a polygonal cross-sectional shape, such as a triangular, rectangular or pentagonal, a non-polygonal cross-sectional shape, a trapezoidal shape, a circular, an elipse or a semicircular shape. In addition, the base of the protrusions might be bigger than the top of the protrusions.

In addition, the number of grooves and number of protrusions per grooves can vary, for example to optimize other tyre requirements such as grip or rolling resistance.

In a tyre according to the invention, the number of grooves 110 oriented at an angle between +45 and −45 degrees with respect to the rolling direction of the tyre can be any number typical for tyres, for example, 1, 2, 3, 4, 5, 6, 7, 8, 9, 10, 11 or 12 of such grooves. The addition of a plurality of protrusions 120 to such a groove will reduce the sound emission from that groove.

Therefore, in a tyre according to the invention, at least one groove 110 oriented at an angle between +45 and −45 degrees with respect to the rolling direction of the tyre contains a plurality of protrusions 120.

The sound emission can be reduced more by providing more grooves with a plurality of protrusions. In one embodiment of the invention the amount of grooves that contain a plurality of protrusions is ≥25 to ≤100%. In a preferred embodiment of the invention the amount of such grooves that contain a plurality of protrusions is ≥50 to ≤100%. Most preferred, all grooves are oriented at an angle between +45 and −45 degrees with respect to the rolling direction of the tyre contain a plurality of protrusions.

The number of protrusions 120 in a single groove 110 in a tyre according to the invention can be any number larger or equal to 2. For example the number can be ≥3 to ≤1000, preferably ≥3 to ≤31. The (preferably circumferential) groove in a tyre which has a high number of protrusions has a larger amount of air layers, and therefore the sound energy dissipation is increased.

In a preferred embodiment of a tyre according to the invention, the tread portion comprises 4 grooves, wherein each groove contains 12 protrusions.

In an embodiment of the tyre according to the invention, the groove 110 comprises a groove bottom 112 and a groove wall 116, and the protrusions 120 are extending from the groove bottom 112 in the radial dimension as illustrated in FIG. 1.

The orientation of the protrusions 120 in a radial dimension will allow an easy access of the outside air in the space between the protrusions, thereby increasing the viscother effect and allowing for higher sound energy dissipation.

Figure 2:
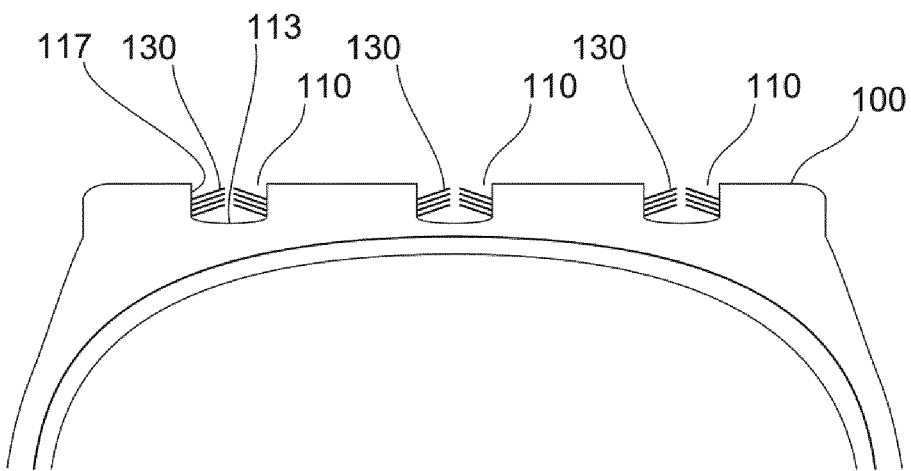
FIG. 2 shows a section of another embodiment of the tyre according to the invention in a cross-sectional view.

In another embodiment of the tyre according to the invention, the groove 110 comprises a groove bottom 113 and a groove wall 117, wherein the protrusions 130 are extending from the groove wall 117 as illustrated in FIG. 2.

Once the air is distributed in the groove, this orientation of the protrusions will also increase the viscothermal effect allowing for higher sound energy dissipation. In addition, this orientation might be more resistant against rupture during operation of the tyre.

In a preferred embodiment shown in FIG. 2, the protrusions 130 extending from the groove wall, define an angle with respect to the axial dimension of the tyre of ≥10 degrees. For example, FIG. 2 shows an angle in this respect of approximately 20 degrees. This orientation allows for an easy access of the outside air in the space between the protrusions. Preferably, the angle range is ≥15 to ≤85 degrees, more preferred ≥20 to ≤60 degrees.

In another embodiment of the tyre according to the invention in a cross-sectional view the porosity $\Omega_g$ of the groove 110 is ≥0.1 to <1.0. Preferably the porosity of is ≥0.25 to <1.0.

The porosity $\Omega_g$ is the ratio of the air gap surface area within one groove 110 surrounding the protrusion 120 and the total surface area of one groove 110 including both the protrusion 120 and the air gap surface area, i.e. the area in a cross-sectional view of the groove not occupied by protrusions divided by the total area. The porosity of a groove is related to the number of protrusions, the width of the protrusion, the distance between the protrusions, the thickness of the protrusion, the height of the protrusion and the length of the protrusion. A groove in a tyre according to the prior art, lacking a protrusion will have a porosity of 1, whereas a groove in a tyre according to the invention will have a porosity of <1.

Without wishing to be bound to theory, it is believed that the noise reduction can be tuned by the porosity of the groove. The viscothermal effects and related sound energy dissipation are higher with an increased porosity, while keeping the distance between the protrusions and the height of the protrusions constant.

In one embodiment of the tyre according to the invention, the protrusions in a cross-sectional view have a width which is ≥0.05 to ≤2 mm. Preferably, the width is ≥0.1 to ≤0.5 mm. In general, a slim protrusion will allow for a larger amount of protrusions, thereby allowing a larger amount of air layers in a single groove; the larger amount of air layers corresponding to a higher sound energy dissipation.

In another embodiment of the tyre according to the invention, in a cross-sectional view the protrusions have a height relative to the groove depth which is ≥45 to ≤100%. More preferably, the protrusions have a height relative to the groove depth which is ≥90 to ≤100%. In FIG. 1 the height of the protrusions extends in the radial dimension of the tyre. In FIG. 2 the height extends at the angle visible in this figure in the axial direction.

The sound energy dissipation in general will be higher for protrusions with a larger relative height compared to the groove depth. However during tyre operation it might be necessary for other properties, such as grip or rolling resistance, to reduce the relative height somewhat as the protrusion might influence these properties. In order to obtain the best balanced tyre properties, the height of the protrusions should be properly tuned.

In another embodiment of the tyre according to the invention the protrusions are spaced apart with a distance of ≥0.1 to ≤3 mm. This increases the viscothermal effects significantly and increases the sound energy dissipation.

In another embodiment of the tyre according to the invention, the protrusions extend in a straight path. This configuration of the protrusions is shown in a top view in FIG. 1 as well as FIG. 3, reference number 120 and 140 respectively.

Such a straight path allows for the introduction of a high number of protrusions, thereby increasing the viscothermal effects and the sound energy dissipation. The embodiment as described in FIG. 3 has the additional advantage that the protrusions obtain additional stiffness from the connection to the groove wall, thereby being more resistance to impact during tyre operation.

Figure 4:
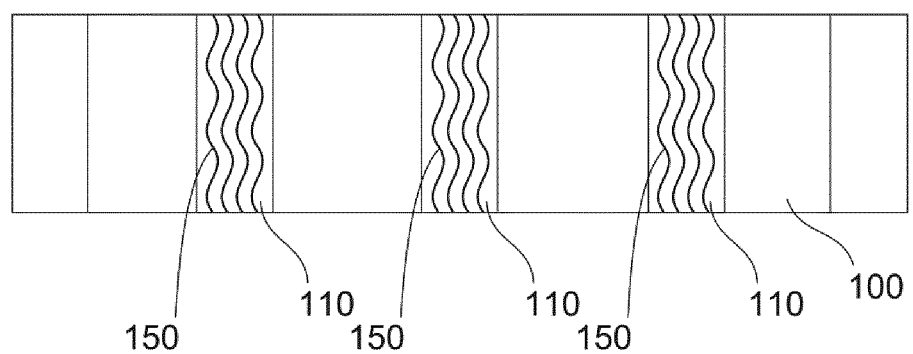
FIG. 4 shows a section of another embodiment of the tyre according to the invention in a top view.
Figure 5:
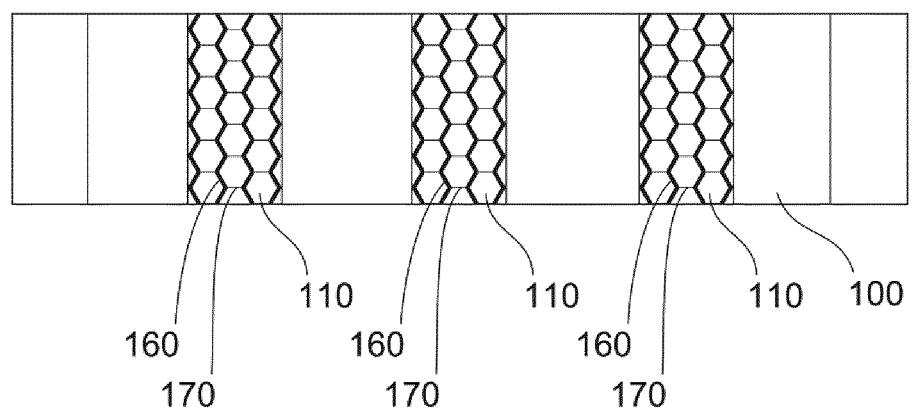
FIG. 5 shows a section of an embodiment of the tyre according to the invention in a top view.

In another embodiment of a tyre according to the invention the protrusions when viewed in the rolling direction of the tyre have an amplitude in the axial dimension of the tyre. Examples of these protrusions are given in FIG. 4 and FIG. 5, with reference number 150 and 160 respectively. The amplitude has the effect that the protrusions extend in a skewed path. The path, for example can be a random wave, a square wave, a sinusoidal wave, a triangular wave etc.

Figure 3:
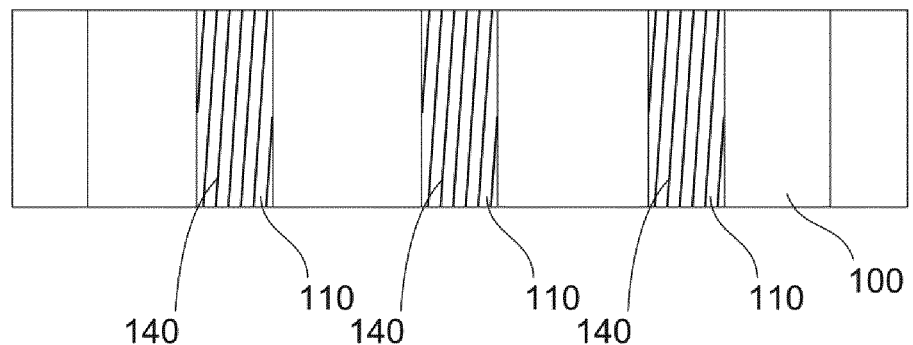
FIG. 3 shows a section of an embodiment of the tyre according to the invention in a top view.

As already outlined in connection with FIG. 1 and FIG. 2 the protrusions can be parallel with the groove, hence defining an angle of zero degrees. In another embodiment of the invention, the protrusions can extend in a non-zero angle in the rolling direction of the tyre, as depicted in FIG. 3, with an angle of about 5 degrees.

An angle of zero has the advantage that the resulting protrusions can correspond to an infinite circumferential protrusions around the tyre, whereas the non-zero angle provides a possibility for different type of cross-sectional path which can for example result in screw-like patterns, wound several times around the tyre in a single continuous groove.

In an embodiment of the invention the protrusions are arranged parallel to each other. Variations of parallel arranged protrusions are depicted in FIG. 1, FIG. 2 and FIG. 3, with reference number 120, 130 and 140, respectively. Preferably the protrusions are arranged parallel as this allows for the smallest, constant distance between the protrusions, and hence the largest number of air layers and the highest amount of sound energy dissipation.

In an embodiment of a tyre according to the invention the length of the protrusions is ≥100% of the length of the tread of the tyre. The larger the length of the protrusions, the higher sound energy dissipation is expected.

In another embodiment of a tyre according to the invention, the protrusions 160 are connected by one or more connecting sections 170. An example of this embodiment is given in FIG. 5.

This embodiment might result in a higher stiffness of the individual protrusion. It is believed that this has the effect that a higher noise reduction is obtained, as the protrusions will maintain their shape at low air pressure variation of noise (<2 Pa).

The connecting sections, in a cross-sectional view can be any height, but preferably have a height relative to the height of the protrusions which is ≥10 to ≤90%.

In the latter case, the connecting sections are sufficiently large to provide additional rigidity and structure under low air pressure, and are sufficiently small compared to the protrusions to allow for maintaining the air layers between the pluralities of protrusions.

In general the protrusions may comprise any of a variety of materials, including for example a rubber, a polymer, a metal, an alloy, or a composite.

To obtain certain material properties, in one embodiment of a tyre according to the invention, the protrusions comprise the same material as the tread. In an alternative embodiment, the protrusions comprise a different material then the tread.

For the purpose of manufacturing of the tyre, it might be beneficial to have the protrusions made of the same material as it requires less tread layers to prepare the tyre. However, depending on the properties of the tread surface, it might be preferable to introduce another material as different properties might be needed for the tread surface as for the protrusions, due to tuning of other tyre properties.

In another embodiment of a tyre according to the invention, the material of the protrusions has a Shore A hardness of ≥50 to ≤90 according to ASTM D2240, preferably ≥60 to ≤80.

Protrusions whose material has such a Shore A hardness will display a sufficient stiffness for noise reduction, but still be flexible upon contact to water, which can be advantageous for the tuning of other tyre properties such as driving under wet conditions.

In one embodiment, the protrusions comprise an integral part of tread, and are molded with tread 100. In another embodiment, the protrusions are attached to an at least partially cured tyre tread. In another embodiment, the protrusions are cut out of the tread, specially adapted to cut out protrusions, after curing of the tyre.

In addition, a method of manufacturing a tyre according to the invention is described. The method comprises the steps of providing a mold, the mold comprising an element which is the mirror image of a groove comprising a plurality of protrusions; placing an uncured tyre into the mold, containing an uncured tread adapted to be vulcanized into a tread pattern with a groove with a plurality of protrusion, and vulcanizing the uncured tyre in the mold, thereby obtaining a vulcanized tyre having a groove comprising a plurality of protrusions, and obtaining a tyre according to the invention.

In this method, the element which is the mirror image of a groove can be any type of common mold modification. It can for example be an integral part of the mold, or it can be built up of one or several segments, which are fitted to the mold before placing and curing of the tyre.

EXAMPLES

Figure 6:
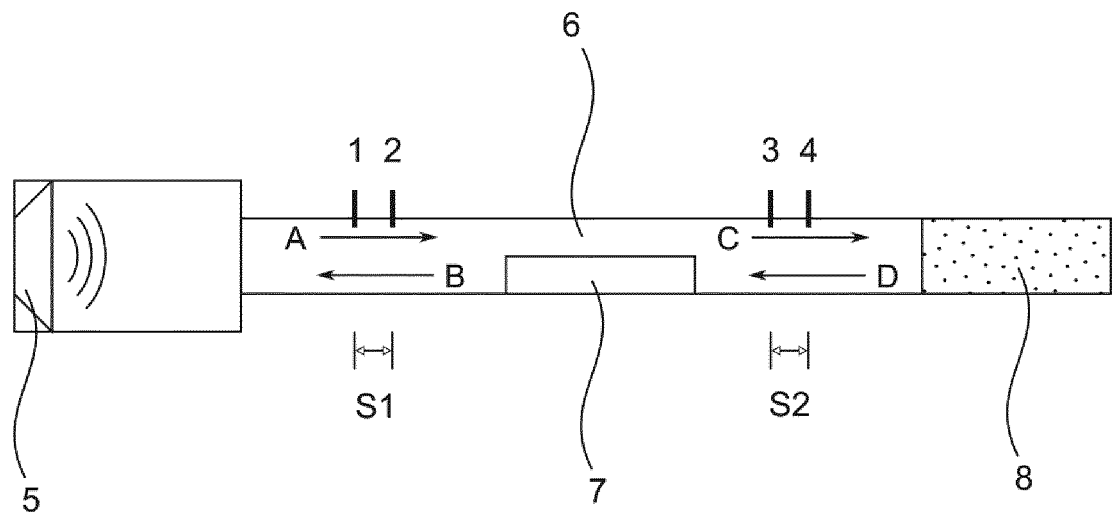
FIG. 6 shows a schematic representation of an experimental setup

Experiments were conducted to determine the influence of the plurality of protrusions within the grooves on sound energy dissipation. A schematic overview of the experimental setup is displayed in FIG. 6. Sound waves are induced by the speaker 5 at the left end of a tube 6 having a circular cross-section. Sound waves propagate back and forth in longitudinal direction of the tube 6. The sample 7 is positioned in the middle of the tube. Four microphones 1, 2, 3 and 4 are used for the measurements, two microphones on each side of the sample 7. Sound absorbing material 8 is placed at the right end of the tube 6. This prevents sound waves which have arrived at the right end of the tube 6 from being reflected back to the sample 7.

The $2p$ method, which uses the transfer function between two microphones, has been used for the calculations (F. J. M. van der Eerden. Noise reduction with coupled prismatic tubes. PhD thesis, University of Twente, 2000). The pressure amplitudes of the forward traveling wave A and the backward traveling wave B at the left hand side of the sample were determined with microphones 1 and 2. The pressure amplitudes C and D at the right-hand side of the sample were determined with microphones 3 and 4.

The following transfer functions were used:

$$H_{21} = \frac{p_2}{p_1}$$

$$H_{43} = \frac{p_4}{p_3}$$

$$H_{31} = \frac{p_3}{p_1}$$

wherein $p_1$, $p_2$, $p_3$ and $p_4$ denote the pressure measured by microphones 1, 2, 3 and 4, respectively.

The reflection coefficient R, which is defined as the ratio of the reflected pressure amplitude B and the incident pressure amplitude A, caused by sound reflection at the left hand side of the sample is computed as (A: pressure amplitude of the incident wave; B: pressure amplitude of the reflected wave; k: complex wave number; $S_1$: distance between microphones 1 and 2):

$$R = \frac{B}{A} = \frac{H_{21} - e^{-ikS_1}}{-H_{21} + e^{ikS_1}}$$

Subsequently, the sound power reflection coefficient r, which is the ratio of the reflected sound ($W_{ref}$) power and the incident sound power ($W_{in}$), is computed with:

$$r = \frac{W_{ref}}{W_{in}} = \frac{|B|^2}{|A|^2}$$

The transmission coefficient T, which is defined by the ratio of the pressure amplitude C and the pressure amplitude A, is calculated with (C: pressure amplitude of the forward-traveling wave; $S_2$: distance between microphones 3 and 4):

$$T = \frac{C}{A} = \frac{-H_{43} + e^{ikS_2}}{-H_{21} + e^{ikS_1}} \cdot H_{31}$$

The sound power transmission coefficient $\tau$, which is the ratio of the transmitted sound power ($W_{tr}$) and the incident sound power ($W_{in}$), is calculated with:

$$\tau = \frac{W_{tr}}{W_{in}} = \frac{|C|^2}{|A|^2}$$

Subsequently, the dissipation coefficient d and the amount of sound energy dissipation Sd are respectively calculated with:

$$d = 1 - r - \tau$$

$$Sd = -10 \log_{10}(1-d)$$

First, the transmission coefficient was measured for an empty tube. For an empty tube the transmission coefficient should, in theory, be (very close to) one. For the test set up, a frequency range had to be chosen where the empty tube gives a transmission coefficient close to one. The lower limit was determined experimentally and was set to 750 Hz. The diameter of the tube determines the upper limit of the frequency range. This frequency, which is called the cut-off frequency, is computed with $f=c_0/1.7\,d_t$ for a cylindrical tube, where $d_t$ is the diameter of the tube. The impedance tube of the setup has a diameter of 50 mm. Therefore, measurements can be conducted up to 4000 Hz. Hence, the measurements were performed in a frequency range between 750 and 4000 Hz.

The distance between the microphones was 0.038 m. For all frequencies up to the cut-off frequency the half-wavelength was larger than the distance between the microphones.

Figure 7:
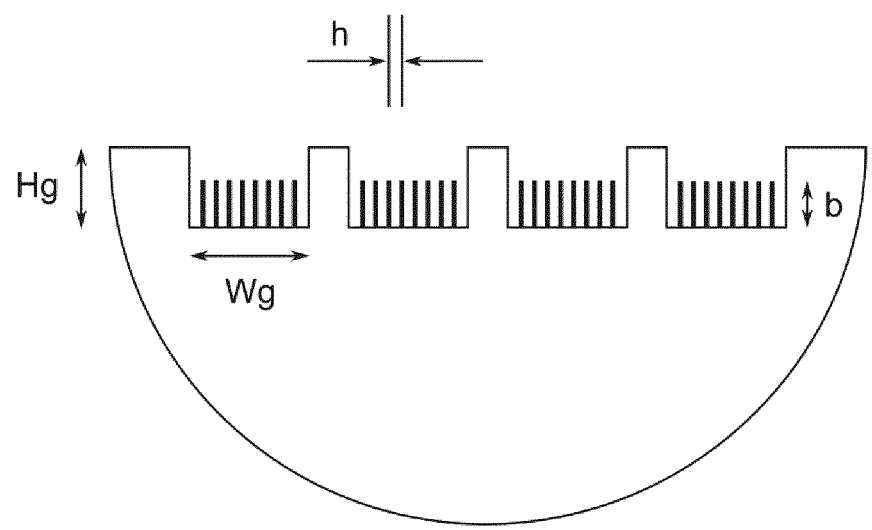
FIG. 7 shows a section of a test-sample

Three samples were manufactured. Their dimensioning was in accordance with the cross-section shown in FIG. 7. All three samples had four grooves with a width Wg of the grooves of 8.5 mm, a depth Hg of 8 mm and a length L of 200 mm. Sample A was a representation of normal tyre grooves and is therefore a sample without protrusions. The other two samples contained a plurality of protrusions which differed in air gap volume and the porosity $\Omega_g$. The air gap volume is the volume in the individual groove which is occupied by air and not by the protrusions. The porosity is the ratio of the air gap surface area within one groove and the surface area of one groove, i.e. the area in a cross-sectional view of the groove not occupied by protrusions divided by the total area Hg·Wg. An overview of the sample dimensions is given in the following table:

| Sample | protrusion width [mm] | protrusion height b [mm] | protrusion distance h [mm] | number of protrusions per groove | Porosity $\Omega_g$ | Air gap volume [mm³] |
|---|---|---|---|---|---|---|
| A | n.a. | n.a. | n.a. | 0 | 1 | 54400 |
| B | 1.33 | 8 | 1.13 | 3 | 0.53 | 28800 |
| C | 1.5 | 8 | 0.5 | 4 | 0.29 | 16000 |

Figure 8:
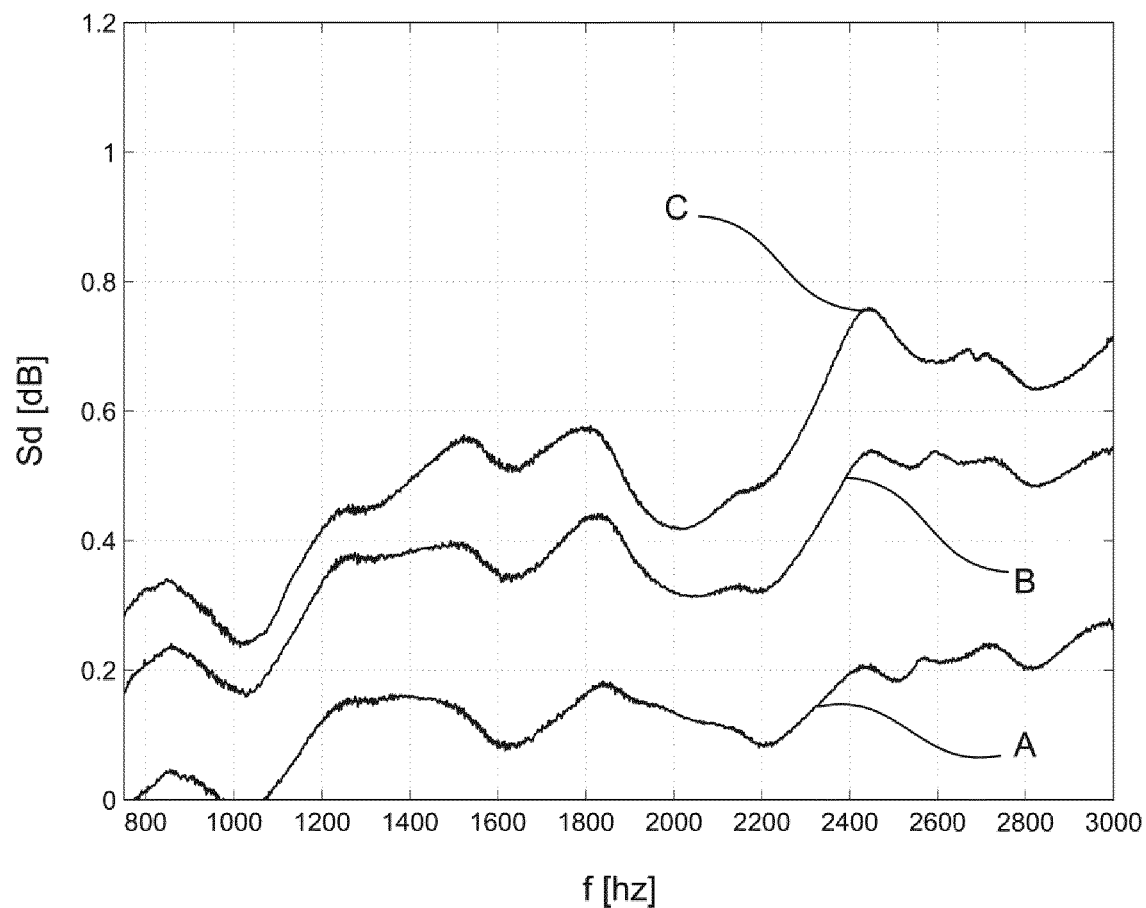
FIG. 8 shows experimental data obtained from the test-samples

The sound energy dissipation Sd, in dB, by the samples is shown in FIG. 8. It is clear from the figure that samples B and C gave a significant sound reduction with respect to the comparative sample A. Sample B, which has a porosity of 0.53 and a distance of 1.13 mm between the protrusions, shows a significant sound reduction. Sample C, which has a porosity of 0.29 and a distance of 0.5 between the protrusions, shows the largest sound reduction.

From the samples it is clear that both the distance between the protrusions as well as the overall porosity influences the sound reduction. It is expected from computational studies (not shown) that a sample with a smaller protrusion width, a small protrusion distance, a high number of grooves and a high porosity would have the largest effect on sound reduction.

Additional sound experiments were performed on a set of tyres comprising longitudinal grooves at an angle of 0 degrees with respect to the rolling direction. Tyres in the size 235/45 R17 were built to study the effect of the protrusions. All tyres were prepared with the same construction and materials. The tread and protrusions were of the same material with a shore A hardness of 65. Tyres with two different tread patterns were studied. Tread pattern X containing longitudinal grooves only (X), as well as tread pattern Y containing both longitudinal as well as transverse grooves (Y). Several embodiments of the invention as well as comparative embodiments were tested for their noise level in both tyre sets. In all instances, the longitudinal groove had a width of 18 mm and contained 10 protrusions. The protrusions had a height relative to the groove depth of 62.5%, were spaced apart with a distance of 0.7 mm and provided a groove porosity $\Omega_g$ of 0.76.

The Close ProXimity (CPX) method has been used in combination with a smooth indoor (steel) drum to study the noise levels of the tyres at a speed of 120 km/h. The noise levels were measured with two microphones placed around the tyre: a CPX front microphone and a CPX rear microphone. The average noise level of the two microphones was calculated for all tested tyres. The noise level is expressed as the difference between a comparative tyre without protrusions and the corresponding tyres with protrusions.

The details and results are summarized in the table below (a positive value means a reduction of noise with respect to the reference tyre, a negative value means an amplification of noise with respect to the reference tyre). Tyres with protrusion lengths of 0, 25 and 50% were comparative examples.

| Example | Tread Pattern | Protrusion Angle | Protrusion length | $\Delta SPL_{RMS}$ (0-4000 Hz) [dB(A)] 120 km/h |
|---|---|---|---|---|
| 1 | X | 0 | n.a. | 0 (Ref X) |
| 2 | X | 0 | 25% | −0.91 |
| 3 | X | 0 | 50% | −0.81 |
| 4 | X | 0 | 100% | 0.97 |
| 5 | X | 10 | 100% | 1.31 |
| 6 | Y | 0 | n.a. | 0 (Ref Y) |
| 7 | Y | 0 | 25% | 1.38 |
| 8 | Y | 0 | 50% | 0.73 |
| 9 | Y | 0 | 100% | 3.24 |
| 10 | Y | 10 | 100% | 2.21 |

As can be derived from the table, the protrusions in prototype tyre 9 lead to the most pronounced reduction of overall noise emission. In general, protrusion lengths of 0, 25 and 50% performed worse than protrusion lengths of 100% according to the invention.

The invention claimed is:

1. A pneumatic tyre for mounting on a vehicle and for rolling in a rolling direction when mounted on the vehicle, the tyre further having a radial dimension and an axial dimension,
    the tyre comprising a tread portion, wherein the tread portion comprises a groove which is oriented at an angle between +45 and −45 degrees with respect to the rolling direction of the tyre, the groove having a depth extending in the radial dimension,
    wherein the groove comprises a plurality of protrusions extending along the direction of the groove, the number of said protrusions being greater or equal to 3,
    wherein each of said protrusions has a length in the direction of the groove, a width perpendicular to its length and a height,
    wherein each of said protrusions has a length of at least 75% of the circumferential length of the tyre tread,
    wherein the groove comprises a groove bottom and a groove wall, and said protrusions extend from the groove bottom in the radial dimension,
    wherein in a cross-sectional view, each of said protrusions has a height relative to the groove depth which is ≥45 to ≤100%.

2. The pneumatic tyre according to claim 1, wherein in a cross-sectional view, the porosity $\Omega_g$ of the groove is ≥0.1 to <1.0, wherein the porosity $\Omega_g$ is defined as the area in a cross-sectional view of the groove not occupied by protrusions divided by the total area.

3. The pneumatic tyre according to claim 1, wherein in a cross-sectional view, each of the plurality of protrusions has a width which is ≥0.05 to ≤2 mm.

4. The pneumatic tyre according to claim 1, wherein the protrusions are spaced apart with a distance of ≥0.1 to ≤3 mm.

5. The pneumatic tyre according to claim 1, wherein each of said protrusions extends in a straight path.

6. The pneumatic tyre according to claim 1, wherein each of said protrusions when viewed in the rolling direction of the tyre has an amplitude in the axial dimension of the tyre.

7. The pneumatic tyre according to claim 1, wherein each of said protrusions extends in a non-zero angle in the rolling direction of the tyre.

8. The pneumatic tyre according to claim 1, wherein said protrusions are arranged parallel to each other.

9. The pneumatic tyre according to claim 1, wherein the length of each of said protrusions is ≥100% of the circumferential length of the tread of the tyre.

10. The pneumatic tyre according to claim 1, wherein the protrusions are connected by one or more connecting sections.

11. The pneumatic tyre according to claim 1, wherein the material of each of said protrusions has a Shore A hardness of ≥50 to ≤90 according to ASTM D2240.

12. A method of manufacturing a tyre according to claim 1, the tyre comprising a tread portion, wherein the tread portion comprises a groove which is oriented at an angle between +45 and −45 degrees with respect to the rolling direction of the tyre, the groove having a depth extending in the radial dimension, wherein the groove comprises a plurality of protrusions extending along the direction of the groove, the number of said protrusions being greater or equal to 3, wherein each of said protrusions has a length in the direction of the groove, a width perpendicular to its length and a height, wherein each of said protrusions has a length of at least 75% of the circumferential length of the tyre tread, wherein the groove comprises a groove bottom and a groove wall, and said protrusions extend from the groove bottom in the radial dimension, wherein in a cross-sectional view, each of said protrusions has a height relative to the groove depth which is ≥45 to ≤100%; and wherein the method comprises comprising the steps of:
- providing a mold, the mold comprising an element which is the mirror image of the groove comprising the plurality of protrusions;
- placing an uncured tyre into the mold, containing an uncured tread adapted to be vulcanized into a tread pattern with the groove with the plurality of protrusion;
- vulcanizing the uncured tyre in the mold, thereby obtaining a vulcanized tyre having the groove comprising the plurality of protrusions.

* * * * *